April 29, 1969     G. L. PETERSEN     3,440,836
FLEXIBLE CABLE AND CASING ADAPTOR TIP ASSEMBLY
Filed Nov. 1, 1967
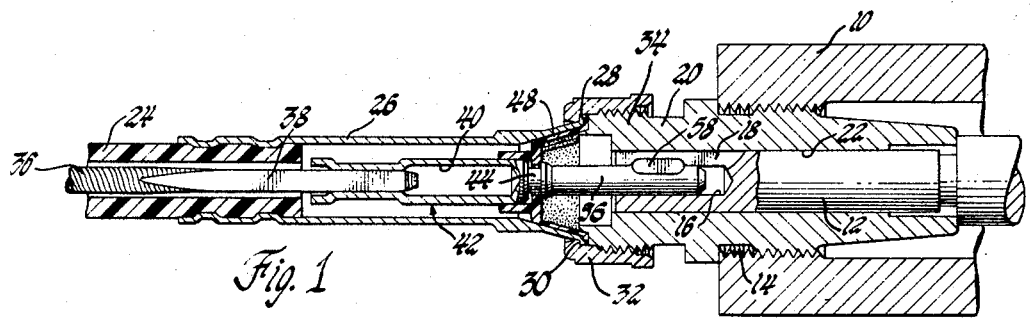
Fig. 1
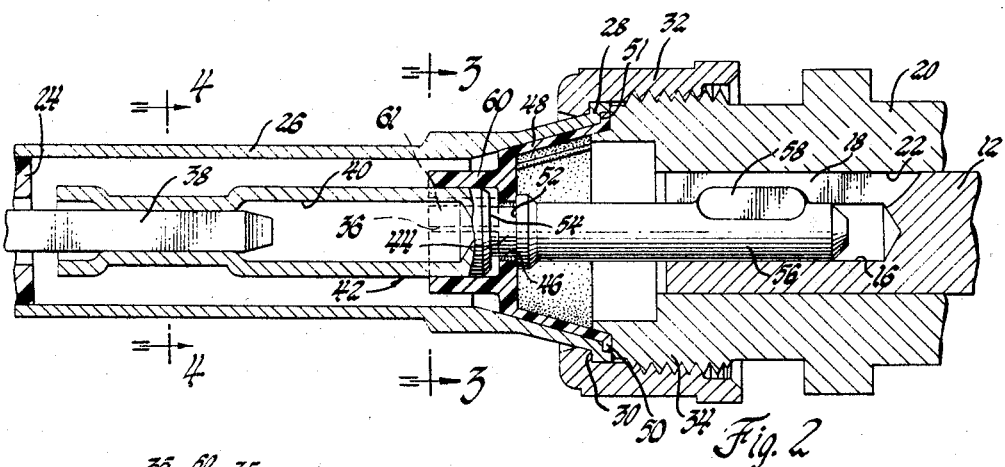
Fig. 2
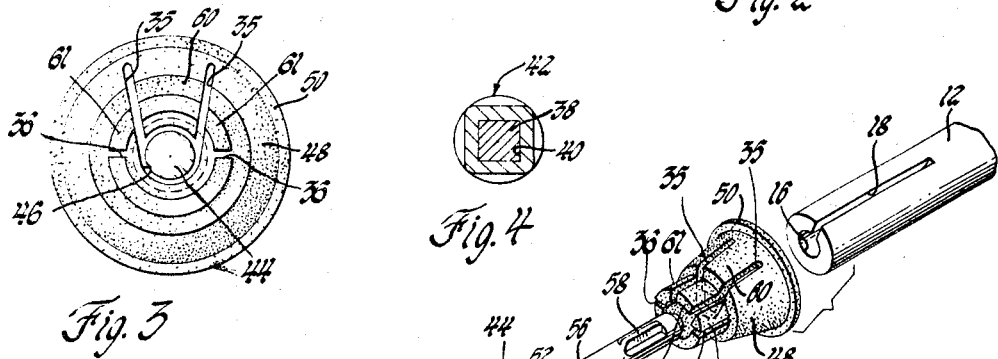
Fig. 3    Fig. 4    Fig. 5
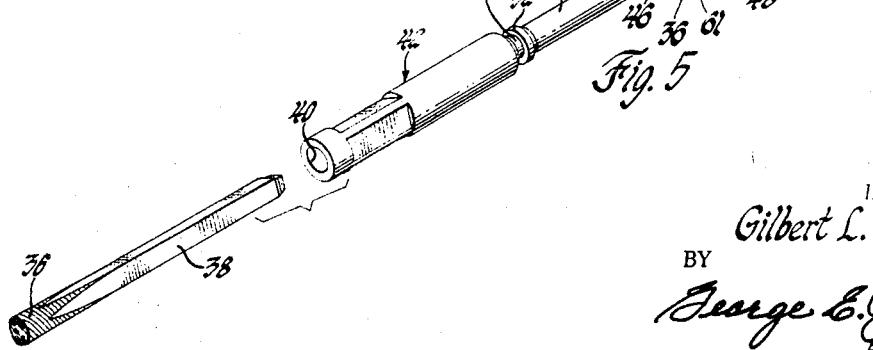
INVENTOR.
Gilbert L. Petersen
BY
George E. Johnson
ATTORNEY

United States Patent Office 3,440,836
Patented Apr. 29, 1969

3,440,836
FLEXIBLE CABLE AND CASING ADAPTOR
TIP ASSEMBLY
Gilbert L. Petersen, Flint, Mich., assignor to General
Motors Corporation, Detroit, Mich., a corporation of
Delaware
Filed Nov. 1, 1967, Ser. No. 679,883
Int. Cl. F16c 1/06
U.S. Cl. 64—4                          7 Claims

ABSTRACT OF THE DISCLOSURE

An assembly for connecting one end of a flexible driving cable and its protective casing to a driving or driven shaft journaled in a fixed mounting, provision being made for variations in the relative lengths of the cable and casing.

This invention relates to a flexible cable and casing connector assembly and more particularly to such an assembly in the use of which the distance between the driver and driven elements connected by a flexible drive cable or wire and its casing may be fixed or variable, but the length of the casing relative to that of the cable or wire is indeterminant.

Although the invention is not limited to use with automobile speedometers, it has been found particularly useful in that field. At the present time many speedometers are driven by flexible cables, each connected to a car transmission as the driving means. These cables extend some distance and often through devious routing from the transmission to the car dash for driving the speedometer and odometer. A nonrotative casing is provided protecting and guiding the flexible cable so that latter will not whip or interfere with other vehicle components, and usually such a casing includes woven wire mesh or embedded wires to strengthen it. Flexible cable and casing assemblies are made to lengths required in the particular installations and a problem has become apparent in that it has been difficult to predetermine the required length of casing to suit a flexible cable to fit a given situation. If a cable is too short it will not drive properly. If it is too long, it may possibly drive well at medium temperatures but will buckle and increase side pressure against the inside of the guiding casing and also exert tensions at other temperatures due to lengthwise contraction of the casing. The longer the drive cable and casing assembly, the greater is the need for accommodating contraction and expansion of the casing length and avoiding localized side pressures by the cable against the guiding casing wall. The situation is aggravated if the deviousness of the cable routing is increased. If this problem is not dealt with, very long lengths of drive cable cannot be used and, despite the use of shorter lengths, excess wear, breakage and/or noisy and erratic performance may be expected especially during long periods of service.

An object of the present invention is to provide an improved cable and casing adaptor tip assembly which is easy to install with assurance that the flexible cable length will be correct for a given length of a guiding conduit or routing for the flexible cable regardless of variations in temperature to which the assembly is to be exposed in use. Another object is to provide an assembly having a coupling member suitable with minor changes to fit various designs of driving or driven members with a minimum inventory requirement with regard to the components of the cable and casing assembly or the driver or driven element.

A feature of the present invention is an assembly usable on either the power input or the power output end of a flexible cable and employing an elongated coupling member not only giving an installer an assurance of adequate range for casing expansion and contraction to effect smooth driving operation but also providing a structure effective in reducing inventories of multiple varieties and lengths of flexible cable and casing adaptor designs heretofore usually required to suit various types of driver and/or driven devices.

This and other important features of the invention will now be described in detail in the specification and then pointed out more particularly in the appended claims.

In the drawings:
FIGURE 1 is a sectional view of one end of a speedometer cable and casing assembly as connected to an automobile transmission for driving a speedometer, the assembly being one embodiment of the present invention;
FIGURE 2 is an enlarged view similar to a porton of FIGURE 1;
FIGURE 3 is a sectional view looking in the direction of the arrows 3—3 in FIGURE 2 to show a detail of construction;
FIGURE 4 is a sectional view looking in the direction of arrows 4—4 in FIGURE 2 showing engagement of two main operative parts; and
FIGURE 5 is an exploded perspective view of a coupling member, a retainer, and ends of a driving member and a flexible cable as utilized in the assembly of FIGURES 1 and 2.

FIGURE 1 shows a boss 10 which is a part of an automobile transmission housing. A shaft 12 is adapted to be driven by the transmission and extends outwardly through a threaded aperture 14 thereof. A recess 16 is formed in the end of the shaft 12 and this recess is enlarged by a slot 18 on one side thereof resulting in a keyform cross sectional opening.

An adaptor 20 is threaded into the transmission casing opening 14 and carries a bore 22 forming a bearing for the shaft 12.

A casing 24 is provided to connect a speedometer (not shown) with the adaptor 20 and this connection is furthered by means of a ferrule 26 fixed to one end of the casing 24 and provided with an outstanding flange 28. An annular surface 30 of this flange is urged by means of a nut 32 into end abutting relation with a threaded extension 34 of the adaptor 20. Although the casing is depicted in the drawings as being solely of plastic material, it will be understood that a wire reinforced casing as is convnetional may often be employed in the practice of this invention.

A flexible driving cable 36 is adapted to rotate within the casing 24 and this cable 36 has a squared end 38 adapted to slide in a recess 40 of an elongated coupling member 42. The recess 40 is of a squared cross section for a suitable length so that the coupling member 42 may slidably but nonrotatably engage the squared end portion 38 of the cable 36.

Intermediate the length of the member 42 is a cylindrical portion 44 which is journaled in an aperture 46 in a retainer 48. The latter is partially frusto-conical and partially cylindrical in shape and is provided with an annular flange 50 clamped between the nut 32 and the end of the adaptor 20. Facing surfaces or shoulders 52 and 54 on the coupling member cooperate with the retainer 48 to prevent axial movement of the coupling member.

One end 56 of the coupling member 42 bears a key 58 which is slidable in the slot 18.

Preferably, the retainer 48 is made of plastic such as nylon. This material is resilient to a certain degree but, in order to permit sliding of the retainer 48 over protrusions on the coupling member 42 during assembly, two long slots 35 and two short slots 36 are made in the retainer. These slots are so formed in the retainer 48 that a long tongue 60 and two short tongues 61 formed between the slots will spring out and then snap back into place between the shoulders 52 and 54 in the member 42 and provide a radially loose bearing or journal surface for the coupling member 42.

The thickness of the flange 50 on the retainer 48 is made slightly greater than the depth of the annular recess 51 receiving it. Upon firmly tightening the nut 32 an excellent seal against foreign matter is effected, while the positive metal to metal joint is retained so that no subsequent loosening will occur. The retainer 48, then, not only serves as a sealing element but it also prevents loosening. The cylindrical portion of the retainer includes a half-circle portion, the two short fingers 61 and a part of the long finger 60, but it definitely aids in assuring coaxial relation of the assembly parts.

In the use of the invention the installer may connect the casing 24 and the cable 36 to the speedometer in any conventional manner and with the lengths of the casing and the cable being precut although the required length of the casing 24 (particularly with certain types of wire reinforcement therein) is not easily predetermined. When so installed, one end of the cable 36 will extend from the other end of the casing 24 and into the interior of the ferrule 26 a certain indeterminate extent. This extent is not easily predetermined because the total length of the casing 24 will vary in accordance with temperature and also because of variations in routing of the cable 36 despite the fact that all of a series of installations may appear to be the same in a structural sense. This indeterminate and variable extent in the difference between the casing and conduit lengths may be ignored in practicing the present invention because the depth of the recess 40 in the coupling member 42 is adequate to take care of the situation.

The coupling 42 is chosen to fit the particular shaft 12 of the transmission (or drive or driven element) which is to be used and when the parts are assembled as shown in FIGURES 1 and 2 and the nut 32 is tightened, the coupling member 42 is freed from any endwise compression or binding heretofore experienced by virtue of the effects of elevated temperature or of reasonable error in predetermining the required cut length of the casing 24.

The assembly lends itself to many forms or designs of driving or driven elements. For example, if a different form fo shaft 12 were employed, or if the recess 16 were deeper or of less depth, the only change required in the assembly would be in the coupling member 42 and that member would be different only with respect to its end 56, i.e., from the surface or shoulder 52 to the right as seen in FIGURE 2. Stockpiling to meet numerous situations may therefore be greatly reduced.

I claim:

1. A flexible cable and casing adaptor tip assembly comprising a protective casing enclosing a flexible driving cable for connecting driving and driven elements, a ferrule fixed to one end of said casing, an outwardly extending surface on one end of said ferrule, an adaptor coaxial with said ferrule, a rotary member journaled in said adaptor, an axially extending recess in said rotary member and having a key-form cross section, holding means urging said surface toward said adaptor, a retainer clamped between said adaptor and said ferrule by said holding means, an aperture in said retainer, an elongated coupling member having a cylindrical cross sectional portion intermediate its axial length, said cross sectional portion extending through said aperture and held coaxial with said rotary member and one end of said cable by said retainer, one end of said coupling member having a cross section conforming with said key-form cross section and slidably retained in said adaptor recess, and the other end of said coupling member having an elongated recess with a cross section effecting slidable and non-rotative retention of said one end of said cable.

2. A flexible cable and casing adaptor tip assembly as set forth in claim 1, said outwardly extending surface being on an annular flange integral with said ferrule, and said holding means being a nut abutting said surface and said adaptor to form a seal.

3. A flexible cable and casing adaptor tip assembly as set forth in claim 1, said elongated coupling member having facing shoulders between which said cylindrical cross sectional portion extends, and said retainer being of flexible material and retained between said facing shoulders to limit axial movement of said coupling member.

4. A flexible cable and casing adaptor tip assembly as set forth in claim 1, the said recesses of said rotary member and said other end of said coupling member being deeper than required by the inserted corresponding ends of said coupling member and said one end of said cable.

5. A flexible cable and casing adaptor tip assembly comprising a protective casing enclosing a flexible driving cable for connecting driving and driven elements, a ferrule fixed to one end of said casing, an annular flange integral with said ferrule, an adaptor coaxial with said ferrule, a rotary member journaled in said adaptor, an axially extending recess in said rotary member and having a key-form cross section, a nut abutting said flange and in threaded engagement with said adaptor and urging said flange toward the latter, a partly frusto-conical retainer of resilient plastic material clamped between said adaptor and said ferrule, an aperture in said retainer, an elongated coupling member having a cylindrical cross sectional portion between two facing shoulders, said cylindrical cross sectional portion being journaled in said aperture and coaxial with one end of said cable, one end of said coupling member having a cross-section conforming with said key-form cross section and slidably retained in said adaptor recess, and the other end of said coupling member being nonrotatively fixed but slidable with relation to said one end of said cable.

6. A flexible cable and casing adaptor tip assembly comprising an elongated casing characterized by length variations when exposed to temperature changes, one end of a flexible driving cable journaled in said casing for transferring power, a ferrule fixed to and extending from one end of said casing, an adaptor coaxial with said ferrule, a rotary member journaled in said adaptor and having an axially extending means of key-form cross section, means holding said ferrule on said adaptor, a retainer clamped between said ferrule and said adaptor, an aperture in said retainer, an elongated coupling member having a cylindrical cross sectional portion extending through said aperture and located between two end portions of said coupling member, one of said end portions conforming with said key-form cross section and slidably retained in said adaptor recess, and the other of said end portions being in driving relation to said one end of said cable.

7. An assembly as set forth in claim 6, said retainer being of plastic material forming a yielding seal between said ferrule and said adaptor, and said ferrule and adaptor being in contact.

References Cited

UNITED STATES PATENTS

| | | | |
|---|---|---|---|
| 1,324,787 | 12/1919 | Berge | 64—4 |
| 3,250,088 | 5/1966 | Hanebuth | 64—4 |
| 3,393,534 | 7/1968 | Hanebuth | 64—4 |

HALL C. COE, *Primary Examiner.*